Figure 1:
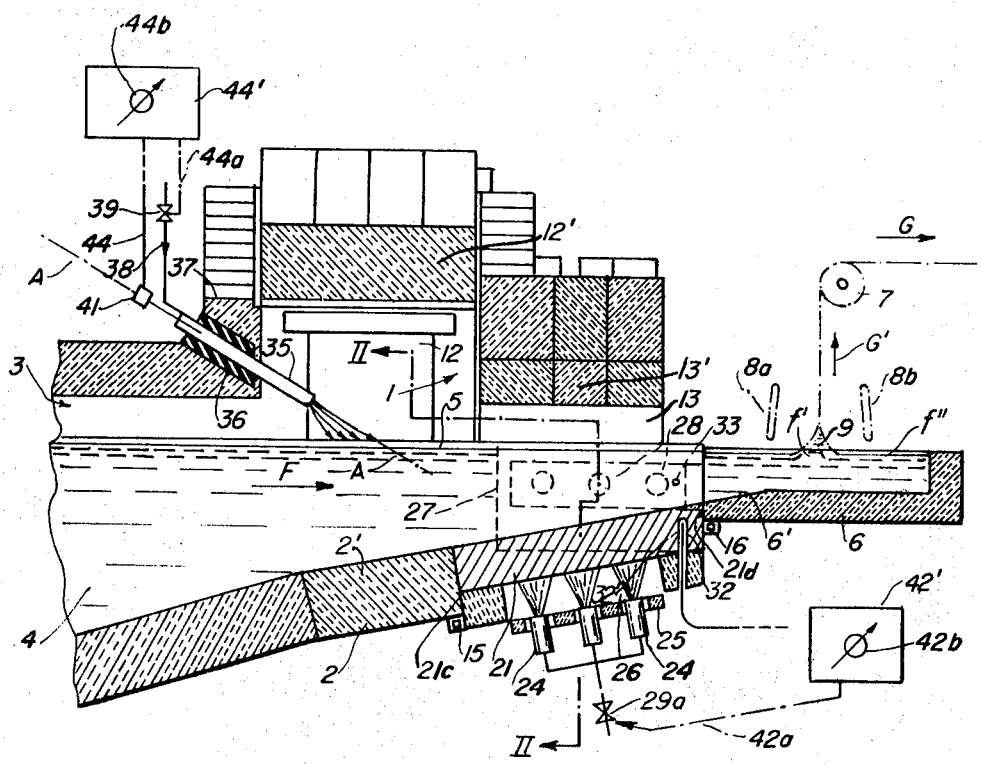

United States Patent
Prislan

[15] 3,658,503
[45] Apr. 25, 1972

[54] APPARATUS FOR THE DRAWING OF CONTINUOUS SHEETS OF GLASS INCLUDING GLASS MELT HEATING AND COOLING MEANS

[72] Inventor: Georges Prislan, Boussois-sur-Sambre, France

[73] Assignee: Societe Boussois-Souchon-Neuvesel, Paris, France

[22] Filed: Feb. 18, 1970

[21] Appl. No.: 12,450

Related U.S. Application Data

[63] Continuation of Ser. No. 526,903, Feb. 11, 1966, abandoned.

[30] Foreign Application Priority Data

Feb. 12, 1965 France..........................................5325

[52] U.S. Cl....................................65/162, 65/136, 65/137, 65/203, 65/204, 65/337
[51] Int. Cl. ..........................................................C03b 5/22
[58] Field of Search..................65/90, 136, 137, 193, 196, 65/203, 204, 337, 346, 162

[56] References Cited

UNITED STATES PATENTS

| | | | |
|---|---|---|---|
| 1,547,910 | 7/1925 | Ferngren | 65/202 |
| 1,554,269 | 9/1925 | Ferngren | 65/202 |
| 3,329,491 | 7/1967 | Zellers, Jr. et al. | 65/204 |
| 3,251,669 | 5/1966 | Dunipace et al. | 65/90 |

FOREIGN PATENTS OR APPLICATIONS

| | | | |
|---|---|---|---|
| 1,341,687 | 9/1963 | France | 65/203 |
| 1,342,246 | 9/1963 | France | 65/203 |

*Primary Examiner*—Arthur D. Kellogg
*Attorney*—Karl F. Ross

[57] ABSTRACT

In drawing sheet glass from a drawing pot of a tank furnace, the flow of molten glass toward the drawing pot is subjected to forced cooling by air nozzles directed onto its upper surface and is simultaneously reheated in its lower reaches, at a location between the cooling zone and the drawing pot, through an ascending bottom surface formed by a floor portion of thermally conductive material.

6 Claims, 2 Drawing Figures

Patented April 25, 1972

3,658,503

INVENTOR:
GEORGES PRISLAN

BY

ATTORNEY.

APPARATUS FOR THE DRAWING OF CONTINUOUS SHEETS OF GLASS INCLUDING GLASS MELT HEATING AND COOLING MEANS

This application is a streamline continuation of application Ser. No. 526,903, filed Feb. 11, 1966, now abandoned.

My present invention relates to a process for the continuous production of glass sheet by the drawing of a flat glass ribbon from a drawing pot and, more particularly, to improvements in a process and apparatus for the drawing of sheet glass in a system of the so-called Libbey-Owens type.

In the Libbey-Owens type of sheet-drawing process, a congealing film of glass is drawn from a layer at the top of a drawing pot and from a layer of cooling glass along the bottom of the drawing pot to form an upwardly extending band of highly viscous and still flexible material which is bent around a roller and conveyed to a hardening, flattening, severing, annealing and/or polishing installation. The molten glass is fed to the drawing pot from the furnace or tank in which the raw material is melted and combined in a more or less continuous manner with the aid of convection currents within this furnace and the gradual withdrawal of the glass from the drawing pot. The drawing pot is thus formed at the end of a relatively shallow channel or trough into which the furnace, of substantially greater depth, opens well above the floor of the furnace and usually only slightly below the level of glass therein. A common drawing method involves the thermal control of the ascending ribbon to make it congeal at a rate sufficient to prevent undue thinning of the ribbon and sufficient to sustain the drawing force applied thereto, without excessive congealing to prevent undue thickening of the glass layer. The region between the drawing pot, at the end of the aforementioned trough, and the main body of the furnace is generally constituted as a thermal-conditioning chamber. Sometimes such a chamber is called a "cooling" chamber since its temperature, although usually of the same order as the temperature of the main body of the furnace, is intended to be intermediate that of the drawing pot and the glass tank.

As the ribbon or sheet of the incompletely congealed glass is withdrawn from the melt in the drawing pot, a transition region of upwardly convergent configuration is constituted between the ribbon or sheet and the melt, such region being designated hereinafter as the "foot" of the sheet. This transition region is formed as the upper film of glass from the drawing pot emerges with the lower film of glass rising from the bottom of the drawing pot to define the sheet. The sheet passes, above its foot, between a pair of cooling members which are spaced apart on opposite sides of the sheet close to the surface of the bath and extend substantially the entire width of the drawing pot. These cooling surfaces serve to congeal the glass at a more rapid rate than would be possible by mere thermal exchange with ambient air and thus are designed to increase the viscosity of the glass. The thickness of the drawn sheet or ribbon is, of course, a function of the drawing speed and an increase in the drawing speed in terms of the rate of production (volume of glass drawn per unit time) will result in a decrease in the thickness of the resulting glass sheet. In order to permit high drawing rates without such decreasing thickness of the drawn glass sheet, it has long been desired, all other things remaining constant, to increase the viscosity and thereby reduce the height of the foot of the glass sheet and to obtain a substantially constant glass thickness even upon an increase in the rate of drawing. This result may be obtained by increasing the number of cooling surfaces and the overall cooling area in the drawing pot and is a consequence of the radiation directed toward or absorbed from the transition zone. For example, one may double the number of cooling members disposed on one or both sides of the foot of the glass and it is observed that this technique efficiently maintains the glass thickness substantially constant even at higher drawing rates. However, this technique results in an increasing turbulent movement of air in the region of the glass surface and gives rise to occlusion of gases by the glass films with the result that defects and mottling are observed in the glass and at its surfaces. Thus, although the rate of production can be increased, the reduced quality of the sheet glass renders the technique uneconomical.

A further technique employed for this purpose involves the cooling of the bath of molten glass in the "cooling" chamber at, for example, a distance of about 1.5 m from the foot of the sheet. This cooling step is carried out with the aid of a stream of fresch air through the chamber or by the circulation of water through walls of the thermal-conditioning chamber or bodies immersed in the molten glass. In fact, both air and water cooling can be used simultaneously. The height of the foot of the glass sheet is thus reduced and the same linear rate of drawing which hitherto gave rise to thin sheets can be used to produce relatively thick ribbons of congealing glass. The cooling of the glass films at the floor and surface of the bath results in a significant congealing of these films so that as they are drawn toward the drawing pot they frictionally act upon the surfaces of the glass tank, thermal-conditioning chamber and drawing pot contacting them. As a practical matter, it is found that the resulting friction between the glass and the refractory surfaces containing same are so markedly increased by this technique that the drawing becomes irregular as a consequence of the poor supply of glass to the drawn sheet and the refractory surfaces experience increased wear so that tank repair and replacement is required earlier than otherwise.

A further disadvantage of the cooling of the bath within this "conditioning" chamber is that devitrification occurs when control is not carefully maintained and, often, even with the most meticulous care after prolonged drawing, it is necessary to expose the devitrified contents of the drawing pot and chamber to an increased supply of heat to cause the requisite "overheating" and ebullition of the bath (boiling) to restore the melt to its original state. Not only do such processes involve a substantial expenditure of fuel but they result in an interruption of production and a consequent increase in production costs.

It is, therefore, an important object of the present invention to provide a method of operating a glass-drawing apparatus which permits of increasing the output of the apparatus without the disadvantages hitherto encountered and which is capable of improving the uniformity of sheet glass produced by the process.

A further object of this invention is to provide an apparatus for the drawing of sheet glass which permits of a significant increase in the production rate, is not disadvantaged by decreasing sheet thickness with increasing drawing speed, and can operate for substantially longer periods than has been possible heretofore without devitrification.

These objects and others which will become apparent hereinafter are attained, in accordance with the present invention, with an improved method of drawing glass sheet by the Libbey-Owens technique which involves a superficial cooling of the glass bath in the conditioning chamber with the aid of an air blast while the bottom portions of the bath traversing this chamber are conductively reheated by the direct contact with the melt via a surface forming the floor of the chamber and heated externally thereof. Advantageously, the thermal-conditioning chamber is subdivided into a low-height compartment proximal to the drawing pot, which is provided with the usual drawing means, while a high-ceiling compartment is disposed between the low-height compartment and the continuously operable glass tank, the reheating surface forming the floor of the low-ceiling compartment proximal to the drawing pot while the air blast is directed against the upper surface of the melt rearwardly of the reheating means, i.e., in the high-ceiling compartment. I have discovered that this system sharply increases the rate of production without producing deterioration of the surface or nonuniform thickening of the drawn sheet and, indeed, permits previous drawing speeds to be used to yield uniform albeit thicker glass sheet.

According to a further feature of this invention, the contact heating of the base of the melt adjacent the drawing pot is carried out by subdividing the contact surface transversely into a multiplicity of longitudinally extending zones which span the entire width of the glass-flow channel and which are provided with individual heating means, each having a respective control and indicating device to permit adjustment of the heating means to maintain individual temperatures at each zone which differ from zone to zone and permit an optimum glass-flow rate with a minimum of irregularity. Moreover, the cooling means rearwardly of this floor of the thermal-conditioning chamber can include a multiplicity of tubes directed forwardly and downwardly in the direction of movement of the melt, each aligned with a respective zone and having temperature-sensitive means trained upon the region in which the respective air jet impinges upon the glass surface. Again, it is possible to modify even the surface temperatures from zone to zone and to establish between the surface and base of each zone the optimum temperature differential. The surface cooling is best carried out as described in the commonly owned French Pat. No. 1,341,687 corresponding to my prior U.S. Pat. No. 3,317,300.

The apparatus broadly described above is capable of increasing appreciably the volume rate of production of this system and sharply reduces the number of massive heatings hitherto necessary to overcome the effects of devitrification. It is found that one can obtain in this manner an optimum viscosity of glass with a high rate of feed to the drawing means and yet prevent frothing of the glass and occlusion of air.

Figure 2:
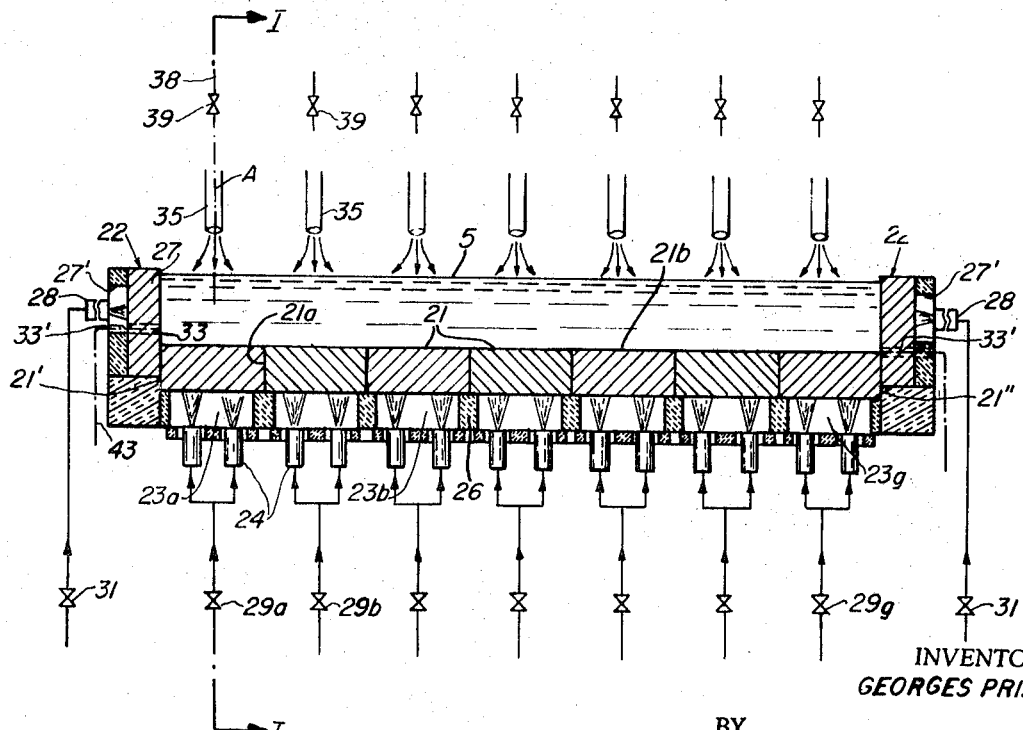

The above and other objects, features and advantages of the present invention will become more readily apparent from the following description, reference being made to the accompanying drawing in which:

FIG. 1 is a longitudinal cross-sectional view through an apparatus for the continuous drawing of glass and taken generally along the line I — I of FIG. 2; and FIG. 2 is a cross-sectional view taken along the line II — II of FIG. 1.

In the drawing I show a particularly satisfactory embodiment of the present invention from the point of view of the apparatus structure at the drawing end of a continuous glass furnace. Such furnaces generally comprise a glass tank of the type described and illustrated, for example, in the commonly assigned U.S. Pat. No. 3,183,072, and, when operated in accordance with the Libbey-Owens system, are provided with a thermal-conditioning chamber at the discharge side of the glass tank through which the glass is fed continuously to a drawing pot provided with means for withdrawing at this last stage a sheet or ribbon of congealing glass at the surface of the drawing pot. In FIGS. 1 and 2, the thermal-conditioning chamber 1 is shown to be disposed forwardly (in the direction of glass flow) of a channel 3 connecting this chamber with the glass tank (not shown) which is of the usual type described above. The glass tank is operated in accordance with continuous techniques, that is it permits a substantially constant flow of glass to be maintained over the sill at the outlet side of the furnace, this advancing portion of the glass bath being designated 4 and moving progressively in the direction of the principal glass current F toward the drawing pot 6. The molten glass thus flows from the thermal-conditioning chamber 1 to the drawing pot 6 which is provided with the usual means for drawing from the glass bath within the drawing chamber congealing films $f$ and $f'$ of glass and merging them at the "foot" 9 of the glass ribbon or sheet 11; as the glass is withdrawn progressively from the pot 6 past the cooling surfaces 8a and 8b, it is led in the direction of arrow G' over a deflecting roller 7 whence the glass ribbon is bent into a horizontal position and conveyed (arrow G) to the cooling and further processing stations, as is well known per se.

The thermal-conditioning chamber 1, as can be seen from FIG. 1, is subdivided in the direction of flow F of the glass into two contiguous compartments 12 and 13 enclosed by superstructures 12' and 13', respectively; these structures constitute roofs over the glass bath passing through the chambers. The enclosure 12' has a relatively large height whereas the height of the enclosure 13' is relatively small so as to form a constricted free region above the melt in compartment 13 while a relatively unconstricted space is provided at compartment 12. For this purpose, the high ceiling of compartment 12 and the low ceiling of compartment 13 can extend parallel to the bath over the entire width thereof.

According to an important feature of this invention, the floor 2 of the thermal-conditioning chamber 1 is provided, beyond its transition surface 2' with the continuous glass tank and rearwardly of the transition surface 6' with the drawing pot, with an array of contiguous thermally conductive slabs 21 which form a flat bottom surface in the region of the low-ceiling compartment 13 extending the full width of the apparatus (FIG. 2). This surface is bounded laterally by a pair of vertical side walls 22 defined by additional thermally conductive slabs 27. The slabs 21 and 27 are, for example, constituted of an electrically melted material which is refractory but not thermally insulated. It has been found, for example, that ceramic-type materials which are refractory when composed of sintered particles or baked with an inherent porosity or cellular structure, are smeltable by electric-arc processes and can be converted into bodies of excellent thermal conductivity. The sides 21', 21'' of each slab 21 are manufactured with perfect or substantially perfect flatness so that they abut at interfaces 21a which constitute joints of a minimum thickness whereby the entire bottom of the thermal-conditioning chamber is as smooth and continuous as possible. At the opposite longitudinal sides of the ascending slab floor 21b, I provide cooling ducts 15 and 16 (FIG. 1) through which cooling water is circulated. Such cooling means are provided at the junctions 21c and 21d between the slabs 21 and the rearward portion of the floor 2' and the drawing-pot portion 6' adjoining the slabs, respectively; the cooling means serve to maintain the tightness of these joints and prevent thermal dislocation of the adjoining parts which are sealingly connected at the junctions. Thus, a tight seal is made along the floor of the thermal-conditioning chamber even at the junctions between the ceramic portions and the thermally conductive slabs 21.

Each slab 21 defines a heating compartment 23a, 23b, . . . 23g whose length in the direction of the glass flow F is greater than the width of the compartment transversely to such flow i.e., in the plane of the drawing of FIG. 2).

Each heating compartment 23a, 23b, etc., is provided with an array of longitudinally spaced heaters here formed as burners for a fluid fuel medium. Each chamber 23a, 23b, etc., is thus provided with two rows of burners 24, with the rows being spaced from one another in the transverse direction. The burners are mounted in a perforated plate 25 below the heating chambers which are separated from one another by refractory ceramic (low-thermal-conductivity) partitions 26 which are mutually parallel in the direction of glass flow F. The rows of burners thus extend in the direction of flow of the glass parallel to the respective slabs 21, while the slabs themselves are inclined upwardly and forwardly toward the drawing pot, as illustrated in FIG. 1. Similarly, the conductive slabs 27 of the lateral walls 22 define compartments 27' into which a longitudinal row of spaced-apart burners 28 are directed. The burners 28 of these lateral walls lie advantageously in a horizontal plane passing at an intermediate location through the body of molten glass 4. I also provide means for controlling the temperature of the slabs 21 and the lateral walls 27 in the form of valves 29a, 29b, . . . 29g and 31, the latter supplying a liquid fuel to the burner 28 while the former feed this fuel to the burners 24 of compartments 23a – 23g, respectively. The burners can be of the conventional oil-burner type and, for the sake of clarity, are illustrated only diagrammatically. Each of the valves 29a, 29b, . . . 29g controls a respective row of burners of the respective heating compartment and can be adjusted by a respective thermostat means represented by a thermocouple 32 received in a bore 32' of the slab 21 forwardly of the burners and proximal to the face 21b in contact with the glass. As represented by the broken line 42, each of the thermocouples provides a reading of the temperature at an indicator 42' which, in turn, can control the valve 29a, etc., associated with the respective array of burners as represented by the dot-dash line 42a. The degree of correction can be adjusted via a control 42b in the usual manner. A further pair of thermocouples 33 are disposed in respective recesses 33' forwardly of the burners 28 in the lateral slabs 27 and are provided with indicating means and control systems for the valves 31, as previously described.

In addition to the reheating means described above and provided at the floor of the thermal-conditioning chamber, it is essential for the purpose of the present invention that cooling means be provided for the upper surface of the bath and such means is preferably of the type described in my above-mentioned U.S. Pat. No. 3,317,300 whose application Ser. No. 308,587, filed Sept. 12, 1963, had been copending with the present application. Reference is also made to my previously copending U.S. Pat. No. 3,297,423 of Jan. 10, 1967, showing similar cooling means. Thus, within the high-ceiling enclosure 12 of the thermal-conditioning chamber 1, I provide an array of mutually parallel and forwardly and downwardly inclined tubes 35 for directing respective jets of cool fluid against the upper surface of the bath. The air blasts preferably emerge from the tubes at an acute angle to the glass bath and in the direction of movement thereof (arrow F), the tubes 35 being preferably composed of vitreous silica. The tubes 35 are received within refractory sleeves 36 embedded in the wall 37 of the enclosure 12' at a rearward side of the thermal-conditioning chamber. Tubes 35 are parallel to one another and are fed with compressed air via a duct 38 whose valve 39 permits an accurate control of the air supply to each tube. Each of the tubes 35 has an axis A — A in a vertical plane constituting a vertical medium plane between the rows of burners 24 of a respective heating compartment 23a, 23b, etc.; each tube must then be considered to lie in the longitudinal plane of symmetry of the respective compartment.

In addition, I provide means for measuring the temperature at the upper surface 5 of the glass bath at the point of intersection of the respective axis A — A thereof. Such means can include a pyrometric device represented at 41 and extending into the respective tube 35 and adapted to respond to the total radiation from the zone upon which the pyrometric device is trained. Thus, the optical axis of the device, which can include a telescopic pickup portion, coincides with the axis A — A of the respective tube. The outputs of the devices 41 are delivered via respective lines 44 to respective indicator means 44' which, in turn, control the respective valves 39 as represented at 44a and are adjustable to permit any desired response threshold, adjustment ratio or the like to be set at 44b. The indicators 42', 44' can be positioned at a central station for ease of monitoring by the operator.

While the apparatus is in operation, there may arise minor temperature variations between the glass at the surface and the bottom of each zone following the respective slab. It is merely necessary in such cases to control the valves 29a, 29b, etc., or 39 of each zone independently of the other zones to maintain the desired temperatur differential and absolute temperatures. It is thus possible to regulate the temperatures of the longitudinal zones as they are spaced across the width of the chamber and thus establish whatever horizontal temperature differential may be desired in addition to the vertical temperature differential between the surface cooled by each air jet and the bottom heated by each row of burners. The evidence of experience with this system has shown that the former controlled gradient regulates the velocity and rate of production of glass sheet whereas the latter controls and remedies defects of thickness which otherwise would develop in the drawn ribbon. Furthermore, the indicator means for the various thermocouples and temperature-sensitive devices permit the optimum temperature gradient to be established for any desired glass thickness and drawing rate so that periodic regulation to re-establish these conditions is possible. Additionally, the operator can readily re-establish the optimum conditions when switchover from one drawing rate and claimed thickness to another is desired. The higher production rate or reduced proportion of defects substantially decreases the cost of operation. It will be understood that the increase of operating time prior to devitrification, which also characterizes this invention, is a further advantage not to be overlooked.

EXAMPLE

Using a conventional Libbey-Owens-type glass-drawing furnace provided with a drawing pot and thermal conditioning chamber at the output side of a continuous glass furnace, the floor of the thermal-conditioning chamber is replaced adjoining the drawing pot by seven contiguous blocks or slabs, as illustrated in FIG. 2, each of the slabs being composed of electrically smelted material (e.g., alumina) which has a thermal conductivity at least several times that of the baked refractories normally used to form the drawing pot, glass tank and thermal-conditioning chamber. The blocks have a thickness of 20 cm and a length of approximately 1 m, extend contiguously the full width of the channel and are flanked by additional and corresponding blocks similar to those shown at 27. The region below this floor of the chamber is subdivided into compartments each corresponding to one of the blocks and having two rows of three burners each uniformly spaced over the length of the heating compartments. The temperature at the thermocouples 32 of each zone were established as indicated in the following Table, the blocks being numbered sequentially across the width of the furnace.

TABLE I

| Block or slab (21) | Temperature (at 32) |
| --- | --- |
| 1 | 770°C |
| 2 | 760°C |
| 3 | 730°C |
| 4 | 735°C |
| 5 | 795°C |
| 6 | 845°C |
| 7 | 760°C |

The high-ceiling portion of the drawing chamber was provided with seven air tubes 35, which were located as described in my aforementioned U.S. Pat. No. 3,317,300, each air tube being positioned along the vertical plane of symmetry through the respective slab and heating chamber. The air flows through the respective tubes, as regulated by the optical pyrometers thereof, were as follows:

TABLE II

| Air Tube | Air Flow Rate |
| --- | --- |
| 1 | 35 m³/hr |
| 2 | 40 m³/hr |
| 3 | 50 m³/hr |
| 4 | 60 m³/hr |
| 5 | 60 m³/hr |
| 6 | 50 m³/hr |
| 7 | 40 m³/hr |

It was found that this system, all other conditions being equal, resulted in a minimum increase in the drawing rate in terms of glass quantity per unit time of 17 percent, the increase reaching 30 percent when other conditions were favorable. This would not appear to be the upper limit. In other words, when the drawing speed was maintained identical with that of the apparatus prior to the provision of the cooling means and reheating means, an increase of the thickness between 17 and 30 percent was easily obtainable, and when the thickness was selected in accordance with the prior attempts, the sheet glass was drawn at a speed of 17 to 30 percent in excess of that possible with the conventional system.

Furthermore, the surface qualities of the glass drawn in accordance with this invention were far superior in that there was substantially no air occlusion or mottling of the surfaces. There was no substantial devitrification during a run of more than 6 months and thus no need for "boiling" the melt during this period while such treatment was required with the same apparatus, lacking the present improvements, approximately every 3 months.

It will be understood that the present invention can be realized in various ways, e.g., with the use of gaseous fuels and cooling fluids other than air, with electric heating or with other thermally conductive materials for the floor of the conditioning chamber without departing from the spirit and scope of the invention as claimed; these and other modifications of this nature are, therefore, considered to be within the ambit of the claims.

I claim:

1. An apparatus for the continuous drawing of glass sheet, comprising a drawing pot provided with means for drawing a sheet of glass upwardly from said drawing pot; a thermal-conditioning chamber forming a flow path for a glass melt moving from a glass tank to said drawing pot, said chamber having an ascending bottom surface just ahead of said drawing pot; forced-cooling means in said chamber trained upon the upper surface of said melt above said flow path; and means in said flow path for increasing the temperature of the bottom layer of said melt along said floor portion between said forced-cooling means and said drawing; said forced-cooling means including a plurality of tubes extending into said chamber in the direction of movement of the glass melt therethrough and inclined downwardly toward the upper surface of said melt and spaced apart along the entire width of said chamber for directing respective jets of cooling fluid against said upper surface, said floor portion being transversely subdivided into a plurality of zones each extending longitudinally in the direction of movement of said glass melt underneath a respective tube, the temperature-increasing means in said chamber including respective heating means individual to said zones whereby said zones can be maintained at different temperatures across the width of said chamber.

2. An apparatus as defined in claim 1 wherein each of said tubes is provided with respective temperature-sensitive control means trained upon the region of contact of the respective jet with said upper surface for regulating the flow of air through the respective tube to maintain the temperature of the respective region substantially constant, said zones being each provided with respective temperature-sensitive control means for regulating the respective heating means to maintain the temperature of the respective zone constant.

3. An apparatus as defined in claim 2 wherein said floor portion is formed by a plurality of contiguous slabs each defining a respective zone and extending longitudinally in the direction of movement of the glass melt while having a width less than its length, and by partition means below said slabs defining respective heating chambers with each of said slabs, said heating means individual to said zones each including at least one longitudinal array of burners directed at the underside of the respective slab, the temperature-sensitive control means of each zone including a respective thermocouple received in the respective slab close to the glass melt.

4. An apparatus as defined in claim 3 wherein a pair of longitudinal arrays of said burners are transversely spaced apart in each heating chamber and each of said heating chambers is associated with a respective one of said tubes with the respective tube having an axis lying in a vertical median plane parallel to the direction of movement of the glass melt and through the respective heating chamber.

5. An apparatus as defined in claim 3 wherein said bottom surface is flanked by a pair of lateral walls confining said melt between them and including respective thermally conductive slabs in contact with said melt, a longitudinal array of burners directed at an outer surface of each of the slabs of the lateral walls, and respective temperature-sensitive means in each of the slabs of the lateral walls.

6. An apparatus as defined in claim 2 wherein the temperature-sensitive means associated with each of said tubes includes optical pyrometric means received within the respective tube and having an optical axis lying along the axis of the respective tube.

* * * * *